United States Patent [19]
Ozawa et al.

[11] Patent Number: 5,842,828
[45] Date of Patent: Dec. 1, 1998

[54] LIQUID PUMP

[75] Inventors: Yasuo Ozawa, Kariya; Itsuro Hashiguchi, Toyota, both of Japan

[73] Assignee: Aisin Seiki Kabushiki Kaisha, Aichi, Japan

[21] Appl. No.: 674,455

[22] Filed: Jul. 1, 1996

[30] Foreign Application Priority Data

Jun. 29, 1995 [JP] Japan ..................................... 7-164155
Feb. 29, 1996 [JP] Japan ....................................... 8-42852

[51] Int. Cl.$^6$ ...................................................... F01D 23/00
[52] U.S. Cl. .......................... 415/70; 415/113; 415/174.2; 415/231; 416/174
[58] Field of Search .......................... 415/70, 113, 170.1, 415/174.2, 174.3, 230, 231; 416/174

[56] References Cited

U.S. PATENT DOCUMENTS

| | | |
|---|---|---|
| 2,065,834 | 12/1936 | Swennes . |
| 2,449,772 | 9/1948 | Gilman . |
| 2,472,010 | 5/1949 | Gilman . |
| 2,773,453 | 12/1956 | Gemeinhardt ............................. 415/70 |
| 2,897,761 | 8/1959 | Roy, Jr. . |
| 3,252,341 | 5/1966 | Reiter . |
| 5,201,642 | 4/1993 | Hinckley ............................... 415/170.1 |

FOREIGN PATENT DOCUMENTS

| | | |
|---|---|---|
| A-1031957 | 6/1953 | France . |
| A-2229175 | 8/1973 | Germany . |
| 63-189690 | 8/1988 | Japan . |
| 3-8696 | 1/1991 | Japan . |
| 404164186 | 6/1992 | Japan ....................................... 415/70 |
| 720637 | 12/1954 | United Kingdom ...................... 415/70 |

OTHER PUBLICATIONS

*Machinery Design*, vol. 19, No. 1, p. 81 (Jan. 1975), publisher Nikkan Kogyo Shibunsha.

*Primary Examiner*—Thomas E. Denion
*Assistant Examiner*—Richard Woo
*Attorney, Agent, or Firm*—Hazel & Thomas

[57] ABSTRACT

A liquid pump in which a perfect seal is achieved between a liquid and the atmosphere without the use of magnets includes a driving unit coupled to external power for being rotated thereby, a shaft installed obliquely with respect to the axial direction of the driving unit and having one end thereof rotatably supported on the driving unit, an impeller, rotatably supported on a housing so as to rotate in coaxial relation to the driving unit, for rotatably supporting the other end of the shaft and impelling a liquid by being rotated, and a bellows provided between the shaft and the housing for effecting sealing liquid-tightly between the shaft and the housing on the side of the impeller.

3 Claims, 12 Drawing Sheets

FIG. 13

LIQUID PUMP

BACKGROUND OF THE INVENTION

This invention relates to a liquid pump such as a water pump for forcibly circulating an engine cooling liquid such as water or an antifreeze solution such as LLC (long life coolant) which is necessary in any internal combustion engine. More particularly, the present invention pertains to a liquid pump which can advantageously be used in an internal combustion engine as a cooling water pump for circulating engine cooling water through an engine cooling system, but the present invention is not limited to a water pump for such a use.

Conventionally, a water pump for use in an engine cooling system includes a power driven impeller shaft having one end portion connected with a power source, such as an output member of an internal combustion engine, and the other end provided with an impeller for drawing water from a source of water such as a water tank and forcing the water to an outlet of the pump.

In order to prevent the leakage of liquid from between these two ends, the pump is sealed using a mechanical seal provided with a high mechanical sealing capability. However, there are instances where foreign matter contained in the liquid has an adverse effect upon the seal, in which case there is the likelihood that seal effectiveness will not be stably maintained over an extended period of time.

Accordingly, as disclosed in the specifications of the Japanese UtilityModel Laid-Open (KOKAI) Application No. Hei 3-8696 (1991) and Japanese Patent Laid-Open (KOKAI) Application No. Sho 63-189690 (1988), a mechanism has been developed which isolates the liquid from the atmosphere by coupling using magnetic force, with only rotating force being transmitted.

With this liquid pump according to the prior art, however, it has been recognized that the fact that magnetic force is used means that the pump cannot follow up sudden changes in rotational torque. In addition, it is noted that since a number of magnets must be used, the cost is high and the pump is comparatively large in size.

SUMMARY OF THE INVENTION

Accordingly, an object of the present invention is to provide a liquid pump in which an excellent seal can be provided between the liquid and the atmosphere without relying upon magnets.

According to the present invention, the foregoing object is attained by providing a liquid pump comprising a housing, a driving unit coupled to external power for being rotated thereby, a shaft, having first and second ends, installed obliquely with respect to the axial direction of the driving unit, the first end of the shaft being rotatably supported in the driving unit, an impeller rotatably supported on the housing so as to rotate in coaxial relation to the driving unit, for rotatably supporting the second end of the shaft and impelling a liquid by being rotated, and a resilient member provided between the shaft and the housing for effecting sealing liquid-tightly between the shaft and the housing on the side of the impeller.

Rotating the driving unit causes the shaft to precess and rotate the impeller, thereby impelling the liquid through the pump. Since the shaft precesses and does not rotate about its axis, only the two ends of the shaft undergo rotating motion. As a result, a strong seal is maintained between the resilient member and the shaft and a perfect liquid-tight seal can be attained on the impeller side.

The liquid pump further comprises a universal joint secured to the housing for supporting a central portion of the shaft and causing the shaft to precess with respect to the housing.

The shaft precesses smoothly about the universal joint, which serves as the center of precessional motion, so that the resilient member is not subjected to a load.

In one embodiment of the invention, the driving unit is rotatably supported on the housing and a lubricant is sealed within a space delimited by the housing, the driving unit and the resilient member.

The sliding motion between the driving unit and the shaft or the sliding motion of the universal joint is smoothed by the lubricant, as a result of which the pump is smoothly driven.

In another embodiment of the invention, the shaft is provided with a spherical portion at the center of precessional motion thereof, and the resilient member forms a lip seal in abutting contact with the spherical portion.

Since the shaft undergoes precessional motion about the spherical portion, the sealing property of the seal between the lip seal and the spherical portion is maintained in a stable fashion and the lip seal does not sustain any wear.

In another embodiment of the invention, the resilient member is an O-ring which contacts the shaft at a portion thereof which is the center of precessional motion thereof.

Since the shaft undergoes precessional motion about the O-ring, the sealing property of the O-ring between the O-ring and the shaft is maintained in a stable fashion and the O-ring does not sustain any wear.

In a further embodiment of the invention, the shaft is sleeve-shaped and the impeller is provided with a generally V-shaped pump shaft having a first shaft portion rotatably supported on the housing and extending along a central axis of rotation of the impeller, and a second shaft portion extending from the first shaft portion into the interior of the sleeve-shaped shaft.

When the driving unit rotates, the shaft precesses. This motion of the shaft is transmitted to the second shaft portion and the pump shaft rotates about the first shaft portion to impel the liquid through the pump. The shaft does not rotate about its axis. Accordingly, a strong seal is maintained between the resilient member and the shaft and a perfect liquid-tight seal can be attained on the impeller side.

In a further embodiment, the driving unit and the impeller are spaced apart a fixed distance along the axial direction of the pump, the first and second ends of the shaft are each provided with a spherical portion, and the driving unit and impeller are each provided with a spherical recess for receiving a respective one of the spherical portions.

Rotating the driving unit causes the shaft to precess and rotates the impeller, thereby impelling the liquid through the pump. The spherical portion on one end of the shaft slides smoothly in the spherical recess of the driving unit, and the spherical portion on the other end of the shaft slides smoothly in the spherical recess of the impeller.

In a modification of the above embodiment, the driving unit and the impeller are spaced apart a fixed distance along the axial direction of the pump, the first and second ends of the shaft are each provided with a spherical portion, the impeller is provided with a driven pulley supported on the housing so as to be rotatable about the axis of rotation of the driving unit, and the driving unit and driven pulley are each provided with a spherical recess for receiving a respective one of the spherical portions.

Rotating the driving unit causes the shaft to precess, rotates the driven pulley and rotates the impeller, thereby impelling the liquid through the pump. The spherical portion on one end of the shaft slides smoothly in the spherical recess of the driving unit, and the spherical portion on the other end of the shaft slides smoothly in the spherical recess of the driven pulley.

In an even further embodiment, the impeller is provided with a pump shaft supported on the housing so as to be rotatable about the axis of rotation of the driving unit, the pump shaft having a oblique surface on an end portion thereof for contacting an outer surface of the shaft.

Rotating the driving unit causes the shaft to precess. At this point, the oblique surface of the pump shaft is acted upon by a force applied in conformity with the motion of the surface of the shaft; as a result, the pump shaft rotates. Accordingly, the impeller rotates and impels the liquid through the pump.

In another modification, the impeller is provided with a pump shaft supported on the housing so as to be rotatable about the axis of rotation of the driving unit, the pump shaft having a first bevel gear on an end portion thereof, and the shaft having a second bevel gear secured thereto for meshing with the first bevel gear.

Rotating the driving unit causes the shaft to precess. At this point, the first bevel gear revolves without rotating while the second bevel gear is rotated. Accordingly, the impeller rotates and impels the liquid through the pump.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

A first embodiment of the present invention will now be described.

Figure 1:
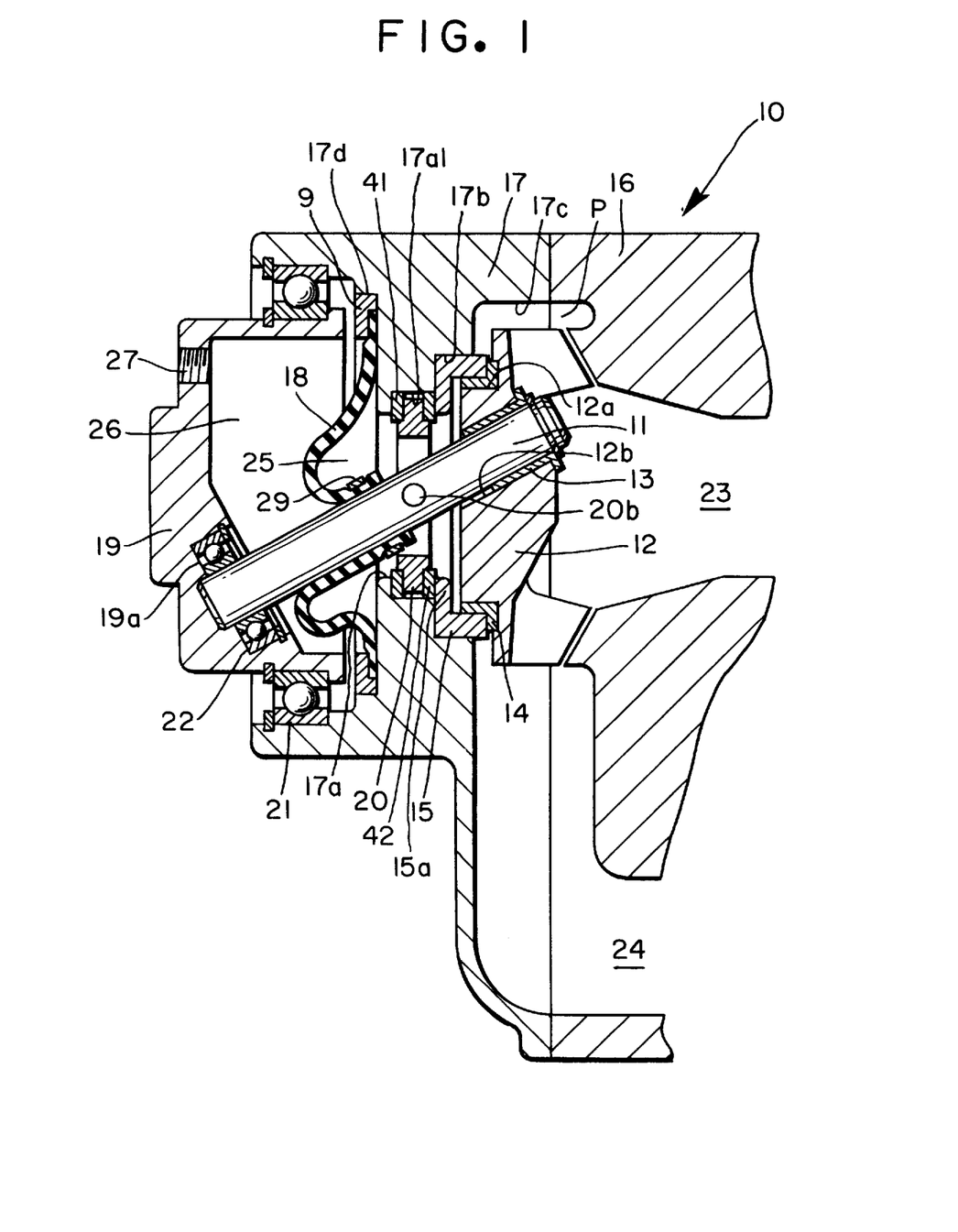
FIG. 1 is a sectional view illustrating a liquid pump according to a first embodiment of the present invention.

A liquid pump 10 according to this embodiment has a cylindrical housing 17 mounted on a cylinder block 16 by bolts. The housing 17 is provided with a stepped bore having a small-diameter portion 17a, a middle-diameter portion 17b and a large-diameter portion 17c. A pair of grooves 17a1 which open toward an impeller side and which are symmetric with respect to the axis of the stepped bore are formed in on the small-diameter portion 17a. A pair of shaft portions 20a of a universal joint 20 are supported in the grooves 17a1 via submerged sliding bearings 41, 42 made of e.g. a phenolic resin, respectively.

Figure 2:
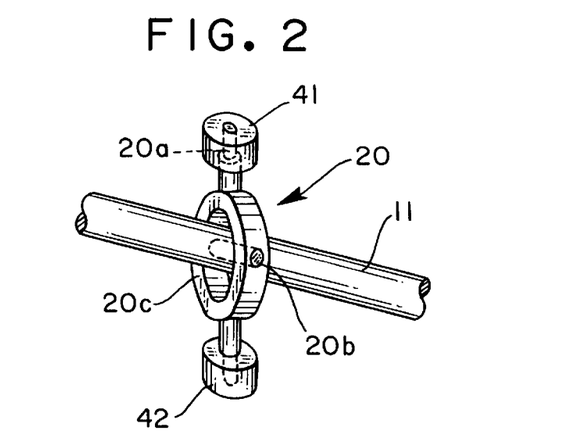
FIG. 2 is a perspective view illustrating a universal joint.

As shown in FIG. 2, a universal joint 20 is provided with a pair of shaft portions 20a outwardly projected from parts of an outer circumferential surface of a ring 20c which are symmetric with respect to the axis of the stepped bore and a shaft portion 20b fitted in a pair of holes which are formed on the ring 20c so as to extend in the vertical direction with respect to the shaft portions 20a. In the ring 20c, a shaft 11 is loosely fitted therein and the shaft portion 20b penetrates the shaft 11. The submerged sliding bearings 41, 42 are press fitted into the grooves 17a1, and the shaft portions 20a are rotatably fitted into bores of the submerged sliding bearings 41, 42, respectively.

A cylindrical member 15 is press fitted into the middle-diameter portion 17b. The cylindrical member 15 is provided with a flange 15a at it's one end and the submerged sliding bearings 41, 42 are prevented from moving toward the middle-diameter portion 17b by the flange 15a. An impeller 12 is located in the large-diameter portion 17c which constitutes a pump chamber P in corporation with the cylinder block 16. The impeller 12 is provided with a stepped portion 12a at it's back surface and is rotatably supported in the cylindrical member 15 via a submerged sliding bearing 14 made of e.g. a phenolic resin at the stepped portion 12a. The stepped portion 12a is located on a coaxial circle about the axial center of the impeller 12. The impeller 12 is provided with a hole 12b disposed at a position offset from its axial center (=center of rotation) and inclined with respect to its axial center. An one end of the shaft 11 is rotatably supported in the hole 12b via a submerged sliding bearing 13 made of e.g. a phenolic resin. A snap-ring is fitted on the outer circumferential portion of one end of the shaft 11 and the impeller 12 is prevented from moving rightwardly by a contact between the snap-ring and the submerged sliding bearing 13, and the impeller 12 is prevented from moving leftwardly by a contact between the cylindrical member 15 and the submerged sliding bearing 14.

A driving unit 19 is supported of the left side (as seen from the viewpoint of FIG. 1) of the housing 17 via a rolling bearing 21 so as to be able to rotate about the axial center of the impeller 12. The center of rotation of the driving unit 19, the center of rotation of the impeller 12 and a part of the shaft 11 in which the shaft portion 20b of the universal joint 20 are coaxial with each other. The driving unit 19 is provided with a hole 19a disposed at a position offset from its axial center (=center of rotation) and inclined with respect to its axial center. The other end of the shaft 11 is rotatably supported in the hole 19a via a rolling bearing 22. A pulley (not shown) is secured to the driving unit 19, and the power of an engine is transmitted by power transmitting means, such as a belt, to the pulley at its belt receiving portion. The belt receiving portion of the pulley (not shown) has a belt center which is axially aligned with the rolling plane of the rolling bearing 21, so that no unbalanced load may not act upon the rolling bearing 21.

An annular bellows (diaphragm) 18 defining a resilient member in the context of the present invention has an inner end fastened liquid-tightly by a ring member 29 to the outer surface of the shaft 11 which is located between its other end and the penetrating part of the shaft portion 20b of the universal joint 20. The outer end of the bellows 18 is liquid-tightly held in a stepped portion 17d of the housing 17 by a ring member 9. A space 26 defined by the inner side of the driving unit 19 and the bellows 18 is filled with air from a hole 27.

In accordance with this arrangement, rotation of the driving unit 19 relative to the housing 17 causes the left end (in FIG. 1) of shaft 11 to revolve. The shaft 11 undergoes precessional motion about the universal joint 20 as center. Consequently, the right end (in FIG. 1) of the shaft 11 also revolves in a plane which perpendicularly intersects the axis of rotation of the driving unit 19 (and therefore the axis of rotation of the impeller 12). The impeller 12 is subjected to a rotating force in accordance with the revolution of the right end of shaft 11 and is rotated to impel a liquid from an intake port 23 to a discharge port 24. At this time, the ring 20c of the universal joint 20 repeats pendulum motion with a small amplitude about the shaft portions 20a. Since a liquid flows in a space 25 on the impeller side of the bellows 18 via sliding surfaces between the submerged sliding bearing 14 and the cylindrical member 15 and flows out to the center portion of the impeller 12 which is located at the low-pressure side via sliding surfaces between the submerged sliding bearing 13 and the shaft 11, excessive high-pressure does not act on the bellows 18 and the bellows 18 performs a sealing function which prevents the liquid from leaking to the side of the driving unit 19. On the other hand, since the liquid is circulated via the space 25 as mentioned above, the submerged sliding bearings 13, 14, 41, 42 are properly lubricated and are cooled with the bellows 18.

Figure 3:
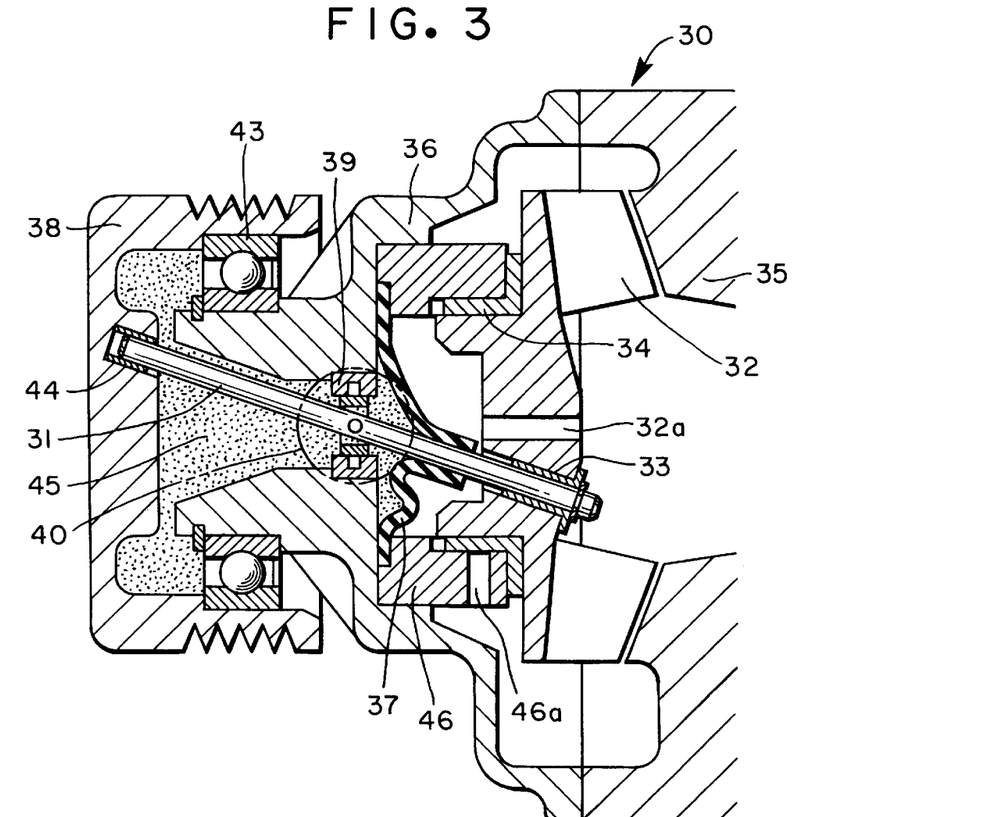
FIG. 3 is a sectional view illustrating a liquid pump according to a second embodiment of the present invention.

A second embodiment of the invention will now be described with reference to FIG. 3.

A liquid pump 30 according to the second embodiment has a cylindrical housing 36 mounted on a cylinder block 35 by bolts. A universal joint 40, which is attached to the inner side of the housing 36 via submerged sliding bearing 39 made of e.g. a phenolic resin, supports a shaft 31 in such a manner that the shaft 31 is capable of precessional motion. A cylindrical member 46, which is secured to the inner side of the housing 36, rotatably supports an impeller 32 via a submerged sliding bearing 34 made of e.g. a phenolic resin. The impeller 32 is provided with a hole disposed at a position offset from its center of rotation and inclined with respect to its axis of rotation. The hole receives the right end (as seen from the viewpoint of FIG. 3) of the shaft 31 via a submerged sliding bearing 33 made of e.g. a phenolic resin. A pulley 38 constituting a driving unit is rotatably supported on the inner left side (as seen from the viewpoint of FIG. 3) of the housing 36, in coaxial relation to the impeller 32, via a rolling bearing 43. The pulley 38 is provided with a hole inclined with respect to the axis of rotation thereof, and the hole receives the left end (as seen from the viewpoint of FIG. 3) of the shaft 31 via a sliding bearing 44. A ring-shaped bellows 37 constituting a resilient member has an inner peripheral portion liquid-tightly fastened to the outer peripheral portion of the shaft 31. The outer peripheral portion of the bellows 37 is liquid-tightly fastened between the housing 36 and cylindrical member 46. A space 45 defined by the inner side of the pulley 38 and the bellows 37 is filled with grease serving as a lubricant. The impeller 32 is provided with a through-hole 32a passing through the impeller 32 in the axial direction. The cylindrical member 46 is provided with a through-hole 46a communicating with the submerged sliding bearing 34.

In accordance with this arrangement, the pulley 38 receives a driving force from a belt (not shown) and is rotated relative to the housing 36, whereupon the left end (in FIG. 3) of the shaft 31 is caused to revolve. The shaft 31 undergoes precessional motion about the universal joint 40 as center. Consequently, the right end (in FIG. 3) of the shaft 31 also revolves in a plane which perpendicularly intersects the axis of rotation of the pulley 38 (and therefore the axis of rotation of the impeller 32). The impeller 32 is subjected to a rotating force in accordance with the revolution of the right end of shaft 31 and is rotated to impel the liquid. Though the liquid fills a space on the impeller side of the bellows 37, the bellows 37 performs a sealing function which prevents the liquid from leaking to the side of the pulley 38. Though the bellows 37 and the submerged sliding bearing 34 generate heat owing to sliding motion, the bellows 37 and submerged sliding bearing 34 are cooled since the liquid readily flows into the space on the impeller side of the bellows 37 via the through-holes 32a and 46a.

Figure 4:
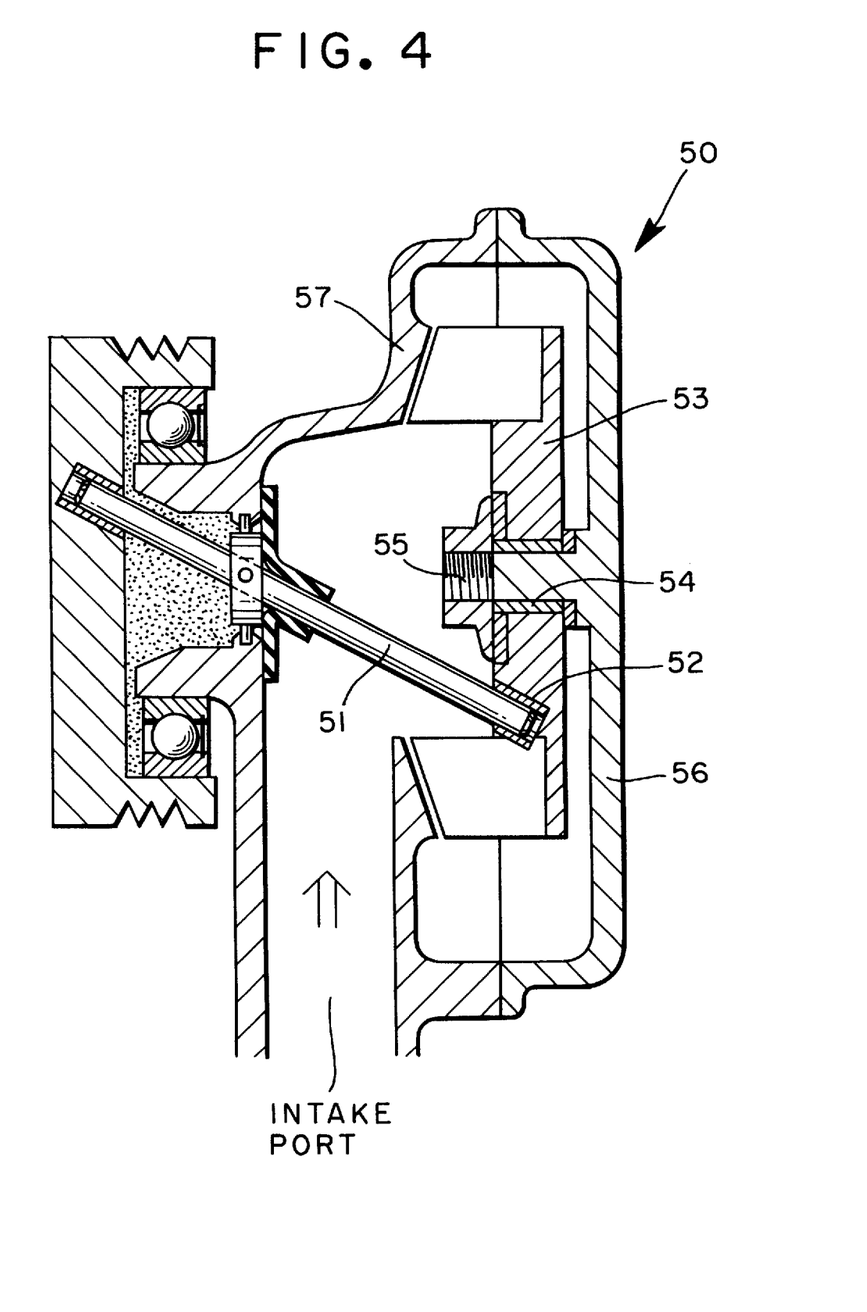
FIG. 4 is a sectional view illustrating a liquid pump according to a third embodiment of the present invention.

A third embodiment of the invention is illustrated in FIG. 4. The third embodiment differs from the second embodiment only in the configuration of the impeller.

According to this embodiment, a liquid pump 50 has housings 56 and 57, which are fixedly secured to each other. An impeller 53 is rotatably supported on the housing 56 by a bolt 55 via a submerged sliding bearing 54 made of e.g. a phenolic resin. The impeller 53 is provided with a hole disposed at a position offset from its center of rotation and inclined with respect to its axis of rotation. The hole receives the right end (as seen from the viewpoint of FIG. 4) of the shaft 51 via a submerged sliding bearing 52 made of e.g. a phenolic resin. The other components of this liquid pump are similar to those of the second embodiment.

In accordance with this arrangement, the impeller 53 and the pulley face each other with the shaft 51 between them. As a result, the liquid pump is simple in structure and is reduced in thickness in the axial direction, thereby providing a more compact assembly.

Figure 5:
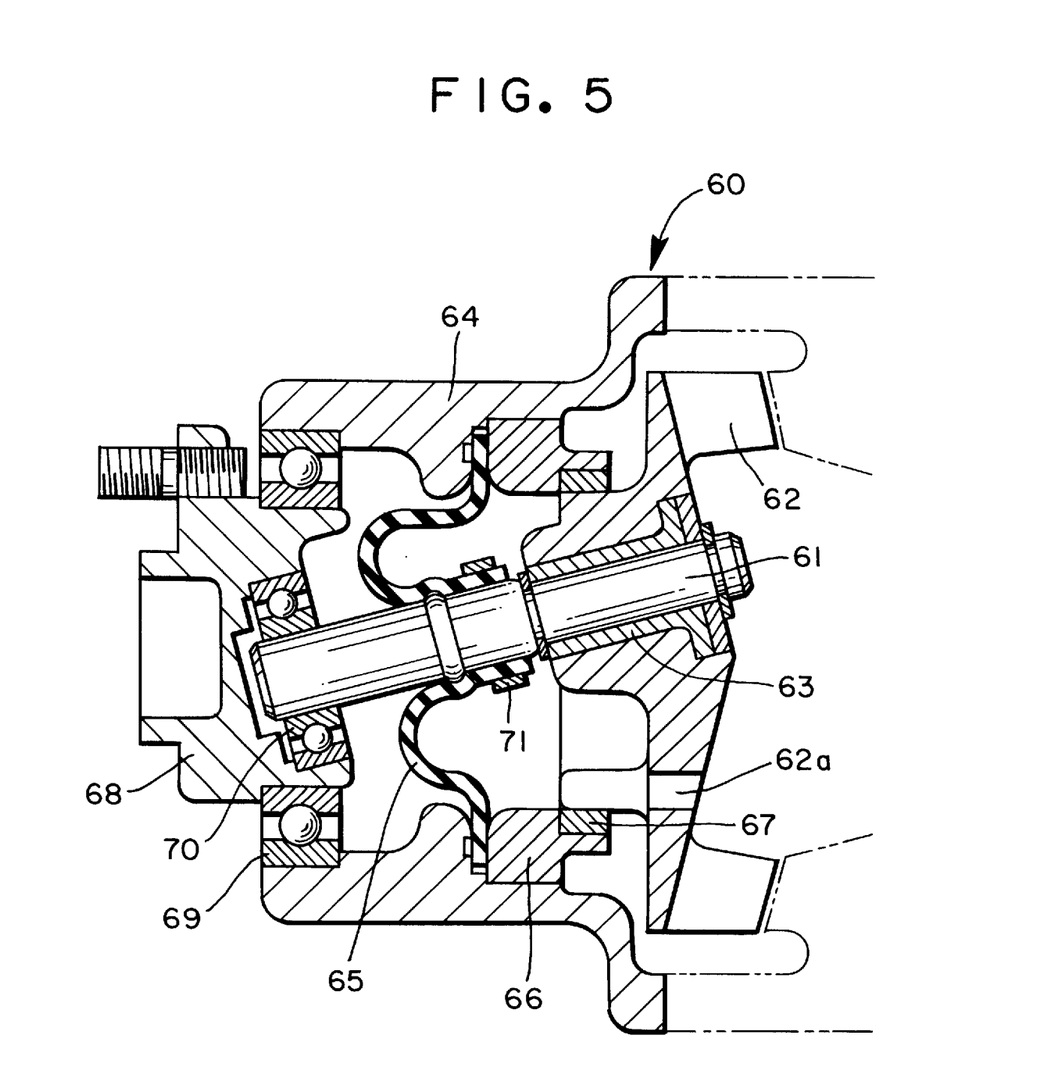
FIG. 5 is a sectional view illustrating a liquid pump according to a fourth embodiment of the present invention.

A fourth embodiment of the invention will now be described with reference to FIG. 5.

A liquid pump 60 according to this embodiment has a cylindrical housing 64 to the inner side of which a cylindrical member 66 is secured. The cylindrical member 66 rotatably supports an impeller 62 via a sliding bearing 67 made of e.g. a phenolic resin. The impeller 62 is provided with a hole disposed at a position offset from its center of rotation and inclined with respect to its axis of rotation. The hole receives the right end (as seen from the viewpoint of FIG. 5) of the shaft 61 via a submerged sliding bearing 63 made of e.g. a phenolic resin. A driving unit 68 is rotatably supported on the inner left side (as seen from the viewpoint of FIG. 5) of the housing 64, in coaxial relation to the impeller 62, via a rolling bearing 69. The driving unit 68 is provided with a hole inclined with respect to the axis of rotation thereof, and the hole receives the left end (as seen from the viewpoint of FIG. 5) of the shaft 61 via a rolling bearing 70. A ring-shaped bellows 65 constituting a resilient member has an inner peripheral portion liquid-tightly fastened to the outer peripheral portion of the shaft 61 by a pin 71. The outer peripheral portion of the bellows 65 is liquid-tightly fastened between housing 64 and the cylindrical member 66. The driving unit 68 is connected to a pulley (not shown) and rotates in response to the rotation of the pulley.

In accordance with this arrangement, rotation of the driving unit 68 relative to the housing 64 causes the left end (in FIG. 5) of shaft 61 to revolve. The right end of the shaft 61 is supported by the impeller 62, and the impeller 62 is rotatably supported on the housing 64. As a result, the shaft 61 undergoes precessional motion and causes the impeller 62 to rotate. Though the liquid fills a space on the impeller side of the bellows 65, the bellows 65 performs a sealing function which prevents the liquid from leaking to the side of the driving unit 68.

Figure 6:
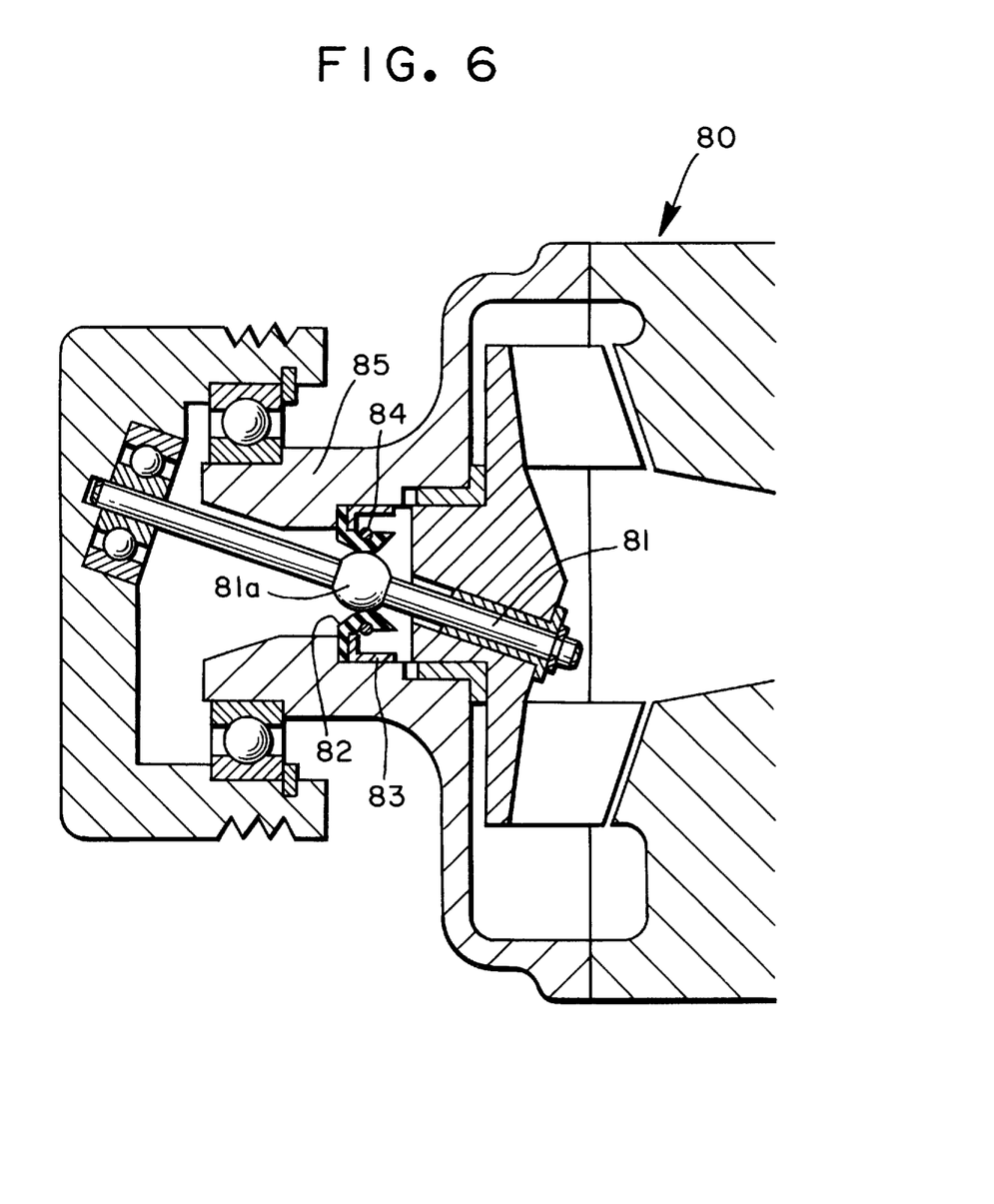
FIG. 6 is a sectional view illustrating a liquid pump according to a fifth embodiment of the present invention.

A fifth embodiment of the invention will now be described with reference to FIG. 6.

A liquid pump 80 according to this embodiment has a cylindrical housing 85 to the inner side of which a ring-shaped lip seal 82 is attached by a fixing member 83, and a shaft 81 having a driving unit attached to one end and an impeller attached to the other end in a manner similar to that of the fourth embodiment. The shaft 81 is provided with a spherical portion 81a at the point which is the center of the precessional motion of the shaft. The lip seal 82 performs its sealing function by coming into abutting contact with the spherical portion 81a. A ring 84 stabilizes the sealing function of the lip seal 82.

In accordance with this arrangement, sealing can be achieved through a simple structure. In addition, since the spherical portion 81a does not rotate, the lip seal 82 does not sustain wear. This provides higher reliability of operation.

Figure 7:
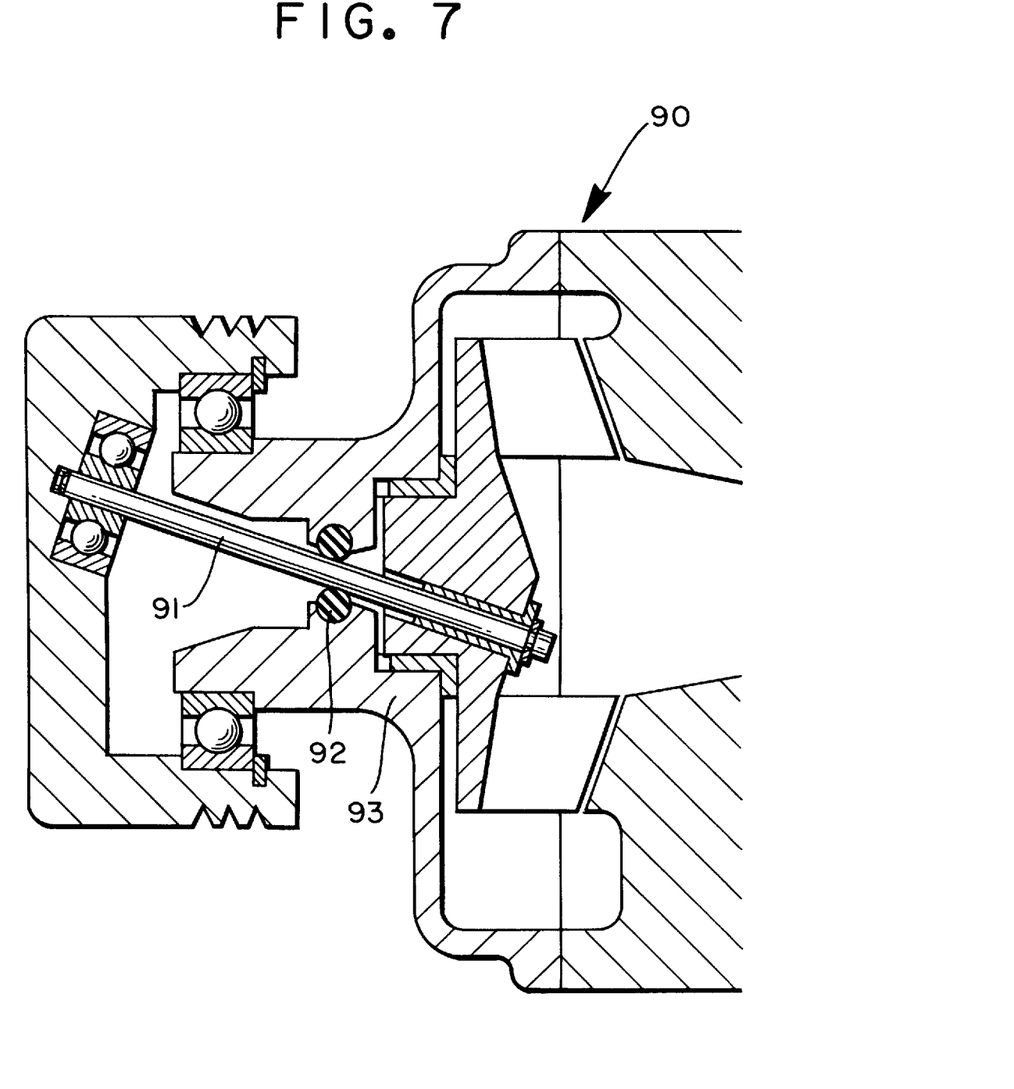
FIG. 7 is a sectional view illustrating a liquid pump according to a sixth embodiment of the present invention.

A sixth embodiment of the invention will now be described with reference to FIG. 7. In the sixth embodiment, an O-ring 92 is substituted for the lip seal of the fifth embodiment.

More specifically, a liquid pump 90 according to this embodiment has a cylindrical housing 93 to the inner side of which an O-ring 92 is attached, and a shaft 91 having a driving unit attached to one end and an impeller attached to the other end in a manner similar to that of the fourth embodiment. The O-ring 92 is in abutting contact with the shaft 91 at the center of precessional motion thereof.

In accordance with this arrangement, sealing can be achieved through a simple structure. In addition, since the center of the precessional motion of the shaft 91 does not rotate, the O-ring 92 does not sustain wear. This provides higher reliability of operation.

Figure 8:
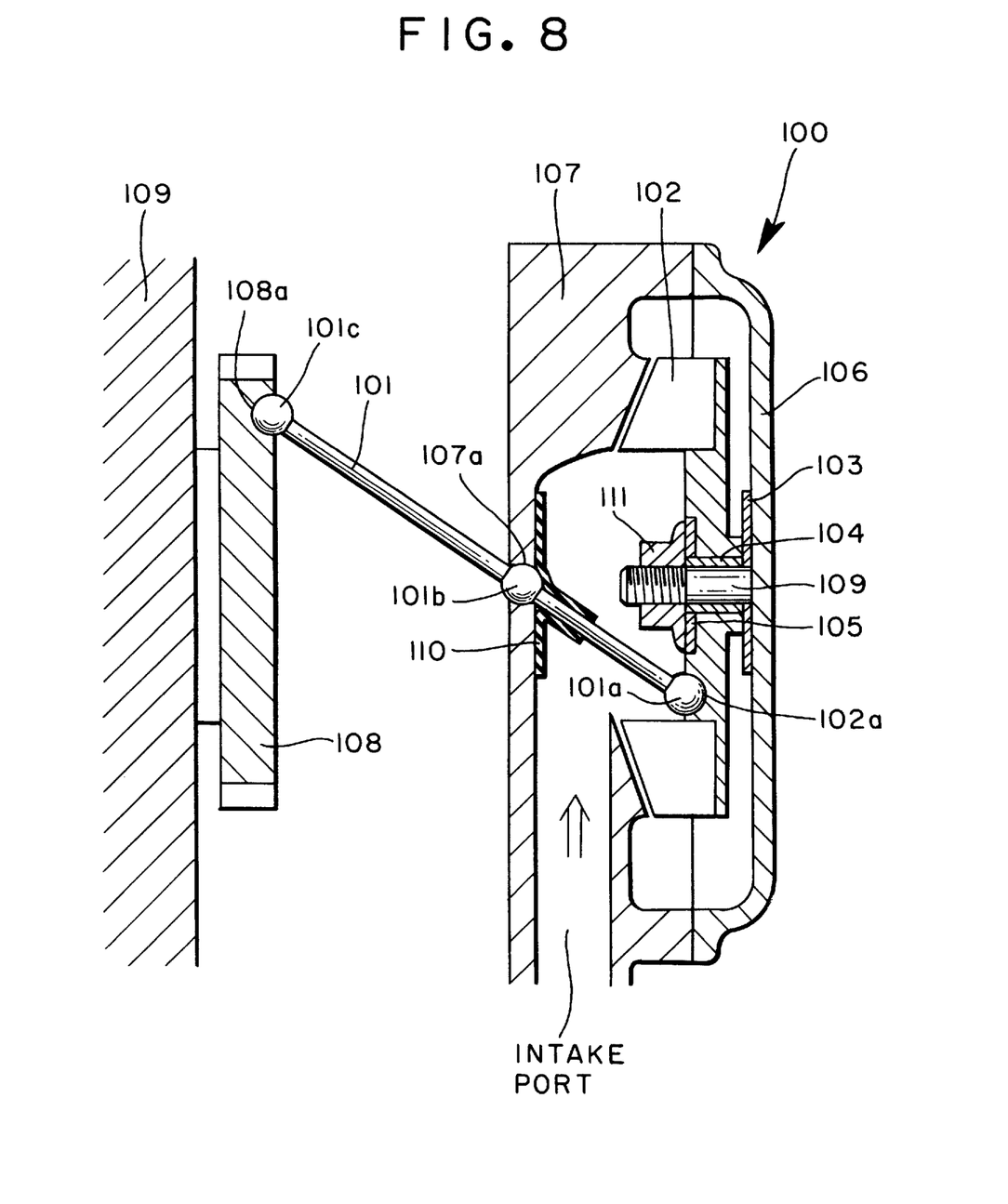
FIG. 8 is a sectional view illustrating a liquid pump according to a seventh embodiment of the present invention.

A seventh embodiment of the invention will now be described with reference to FIG. 8.

A liquid pump 100 according to this embodiment has housings 106 and 107, which are fixedly secured to each other. The housing 107 is formed to have an inwardly extending flange provided with a spherical recess 107a, which receives a spherical portion 101b provided on the central portion of a shaft 101. An impeller 102 is rotatably mounted on a pump shaft 111 by a bolt 109 via submerged sliding bearings 103, 104 and 105 made of e.g. a phenolic resin. The impeller 102 is provided with a spherical recess 102a disposed at a position offset from the center of rotation of the impeller, and a spherical portion 101a provided on the right end (in FIG. 8) of the shaft 101 is received within the spherical recess 102a. Disposedat the left end of the shaft 101 is a driving unit 108 rotated by externally applied power. The driving unit 108 is arranged in coaxial relation to the impeller 102 and is spaced a fixed distance away from the housing 107. The driving unit 108 is provided with a spherical recess 108a disposed at a position offset from the center of rotation of the driving unit, and a spherical portion 101c provided on the left end (in FIG. 8) of the shaft 101 is received within the spherical recess 108a.

A bellows 110 constituting a resilient member is placed between the housing 107 and the vicinity of the spherical portion 101b of shaft 101 so as to provide a seal between these two portions.

In accordance with this arrangement, rotating the driving unit 108 causes the spherical portion 101c of shaft 101 to revolve. The shaft 101 undergoes precessional motion about the recess 107a as center. Consequently, the spherical portion 101a of the shaft 101 also revolves in a plane which perpendicularly intersects the axis of rotation of the driving unit 101a (and therefore the axis of rotation of the impeller 102). The impeller 102 is subjected to a rotating force in accordance with the revolution of the spherical portion 101a and is rotated to impel the liquid. Though the liquid fills a space on the impeller side of the bellows 110, the bellows 110 performs a sealing function which prevents the liquid from leaking to the side of the driving unit 108.

In the seventh embodiment, it should be noted that the liquid pump 100 can be formed with ease if the driving unit 108 is made the output shaft from the engine and the housing 107 is made a belt cover or chain case.

Figure 9:
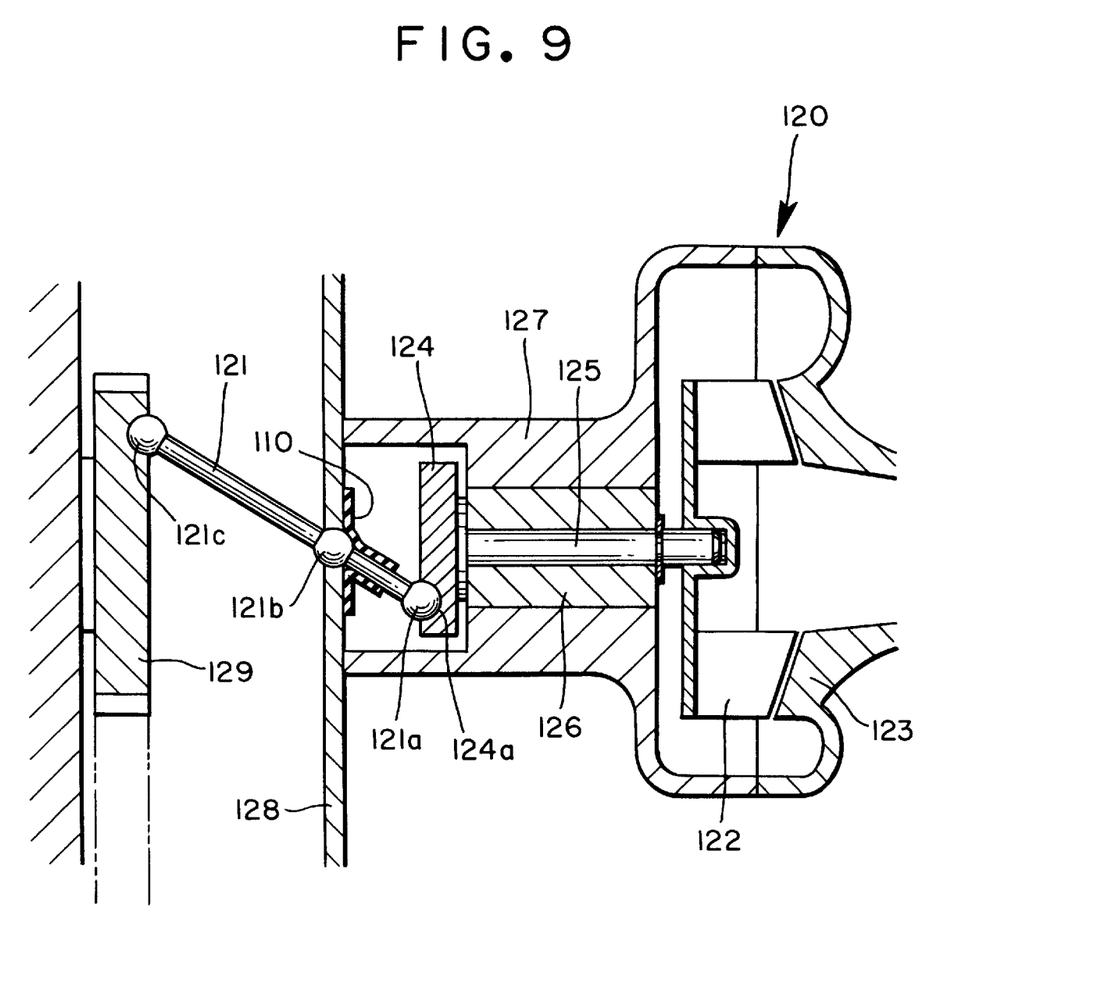
FIG. 9 is a sectional view illustrating a liquid pump according to an eighth embodiment of the present invention.

An eighth embodiment of the invention of the invention will now be described with reference to FIG. 9. This represents a modification of the seventh embodiment.

A liquid pump 120 has housings 123 and 127, which are fixedly secured to each other. A pump shaft 125 is rotatably supported on the inner side of the housing 127 via a submerged sliding bearing 126 made of e.g. a phenolic resin. An impeller 122 is secured to the right end (in FIG. 9) of the pump shaft 125, and a driven member 124 is secured to the left end (in FIG. 9) of the pump shaft 125. The driven member 124 is provided with a spherical recess 124a disposed at a position offset from the center of rotation of the driven member 124, and a spherical portion 121a provided on the right end (in FIG. 8) of a shaft 121 which is revealed by a driving pulley 129 via a spherical portion 121c is received within the spherical recess 124a. The other components of this liquid pump are similar to those of the seventh embodiment, wherein the bellows 110 fixed to a side plate 128 and the shaft 121 is used.

In accordance with this arrangement, the spherical portion 121a of the shaft 121 revolves about a spherical portion 121b as a center and rotates the driven member 124. The impeller 122 is subjected to a rotating force in accordance with the rotation of the pulley and is rotated to impel the liquid.

Figure 10:
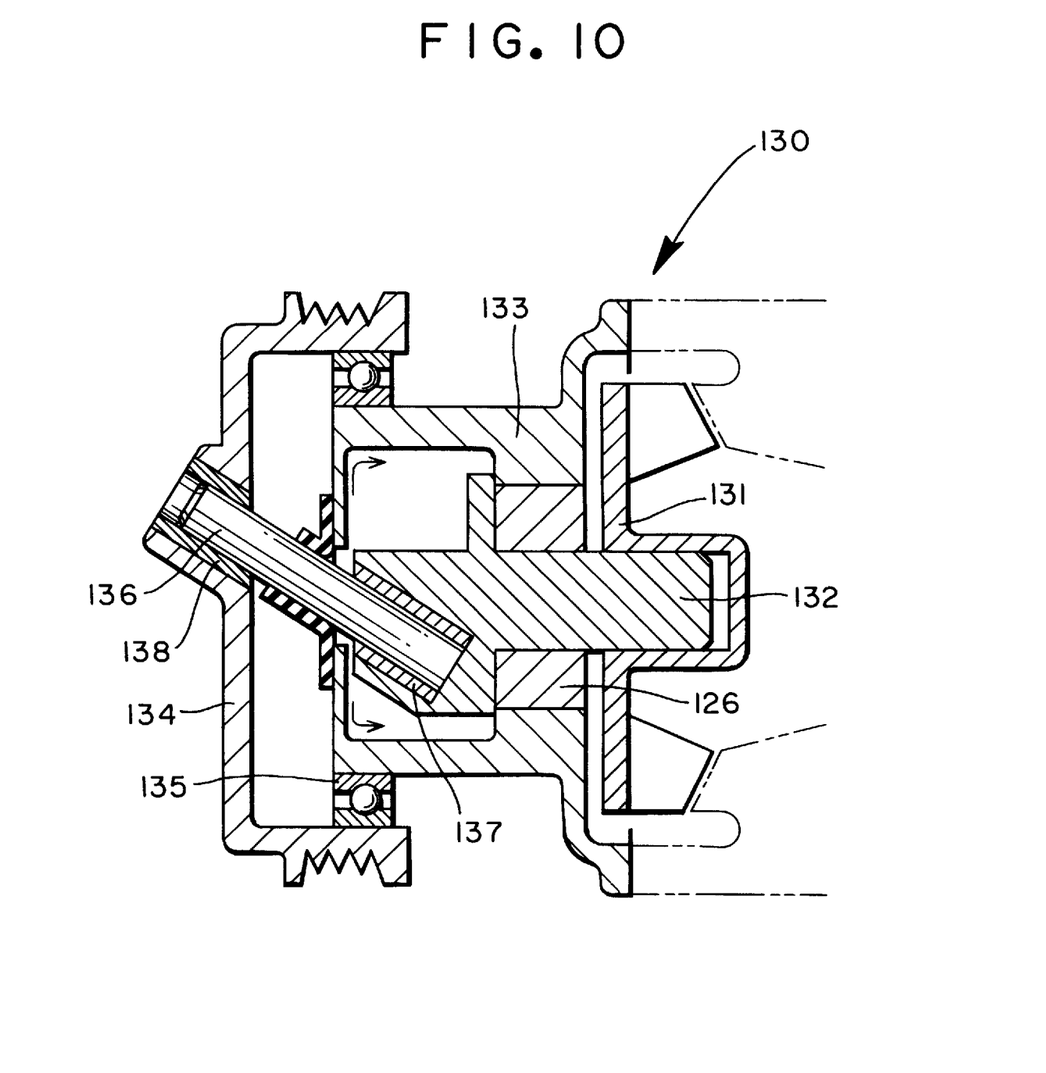
FIG. 10 is a sectional view illustrating a liquid pump according to a ninth embodiment of the present invention.

A ninth embodiment of the invention will now be described with reference to FIG. 10.

A liquid pump 130 according to this embodiment has a cylindrical housing 133. A pump shaft 132 is rotatably supported on the inner side of the housing 133 via a submerged sliding bearing 126 made of e.g. a phenolic resin. An impeller 131 is secured to the right end (in FIG. 10) of the pump shaft 132, and a driven pulley 134 is secured to the left end (in FIG. 9) of the housing 133. The left end of the pump shaft 132 is provided with a hole disposed at a position offset from its center of rotation and inclined with respect to its axis of rotation. The hole receives the right end (as seen from the viewpoint of FIG. 10) of a shaft 136 via a submerged sliding bearing 137 made of e.g. a phenolic resin. The pulley 134 serving as a driving unit is rotatably supported, in coaxial relation to the impeller 131, on the left-hand outer side of the housing 133 via a rolling bearing 135. The pulley 134 is provided with a hole inclined with respect to its axis of rotation, and the hole receives the left end of the shaft 136 via a sliding bearing 138.

In accordance with this arrangement, rotation of the pulley 134 relative to the housing 133 causes the left end (in FIG. 10) of shaft 136 to revolve. The right end of the shaft 136 is supported by the pump shaft 132, and the latter is rotatably supported on the housing 133. As a result, the shaft 136 precesses and rotates the pump shaft 132, thereby rotating the impeller 131 and impelling the liquid.

Figure 11:
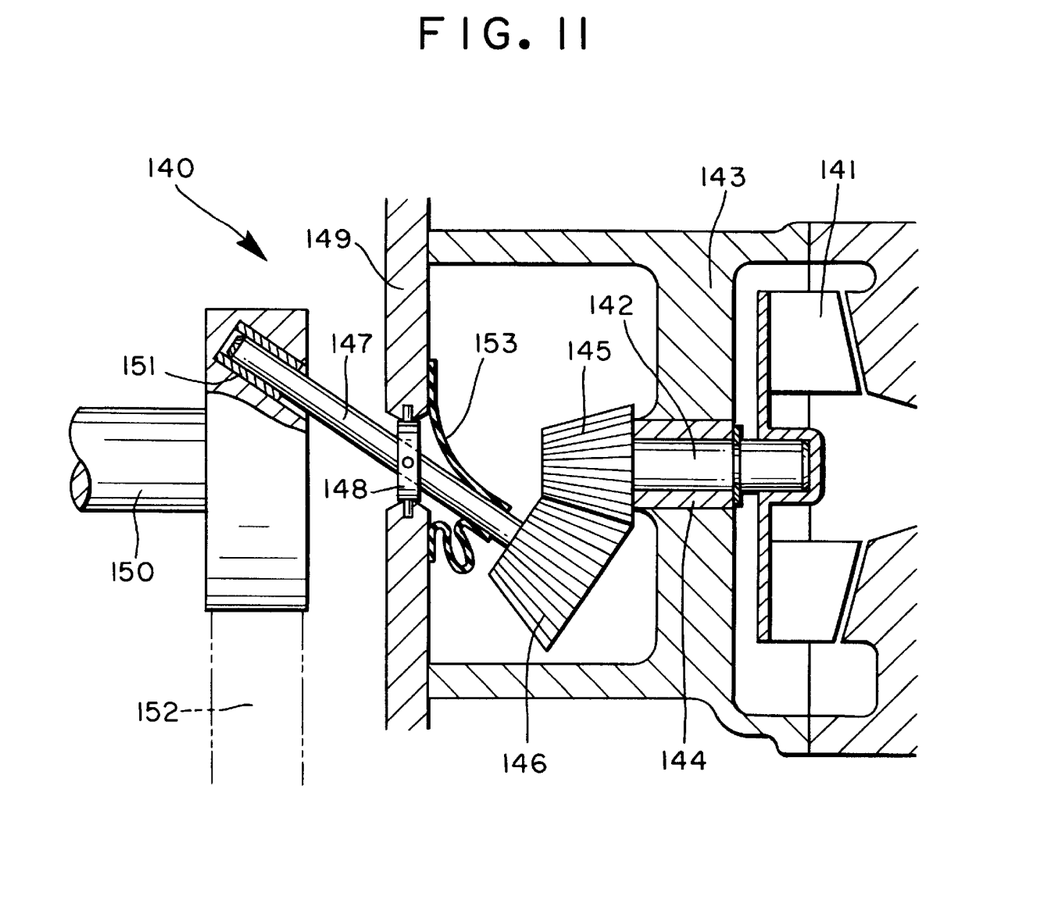
FIG. 11 is a sectional view illustrating a liquid pump according to a tenth embodiment of the present invention.

A tenth embodiment of the invention will now be described with reference to FIG. 11.

A liquid pump 140 according to this embodiment has a cylindrical housing 143. A pump shaft 142 is rotatably supported on the inner side of the housing 143 via a submerged sliding bearing 144 made of e.g. a phenolic resin. An impeller 141 is secured to the right end (in FIG. 11) of the pump shaft 142, and a bevel gear 145 is secured to the left end (in FIG. 11) of the pump shaft 142. An output shaft 150 extending from an engine serving as a driving unit is rotatably arranged, in coaxial relation to the impeller 141, outwardly of the left-hand side of the housing 143. The output shaft 150 is engaged with the drive belt 152. The output shaft 150 is provided with a hole inclined with respect to the axis of rotation of the shaft. The hole receives the left end (as seen from the viewpoint of FIG. 11) of the shaft 147 via a sliding bearing 137. A universal joint 148 is disposed between the central portion of the shaft 147 and a belt cover 149 secured to the housing 143 so that the shaft 147 is capable of precession. A bevel gear 146 is secured to the right end (in FIG. 11) of the shaft 147 and meshes with the bevel gear 145. A bellows 153 constituting a resilient member provides a seal between the belt cover 149 and the shaft 147.

In accordance with this arrangement, rotation of the output shaft 150 relative to the housing 143 causes the left end (in FIG. 11) of shaft 147 revolve. The shaft 147 performs precessional motion about the universal joint 148 as center. The bevel gear 146 revolves accordingly and transmits power to the bevel gear 145, thereby rotating the pump shaft and impelling the liquid.

Figure 12:
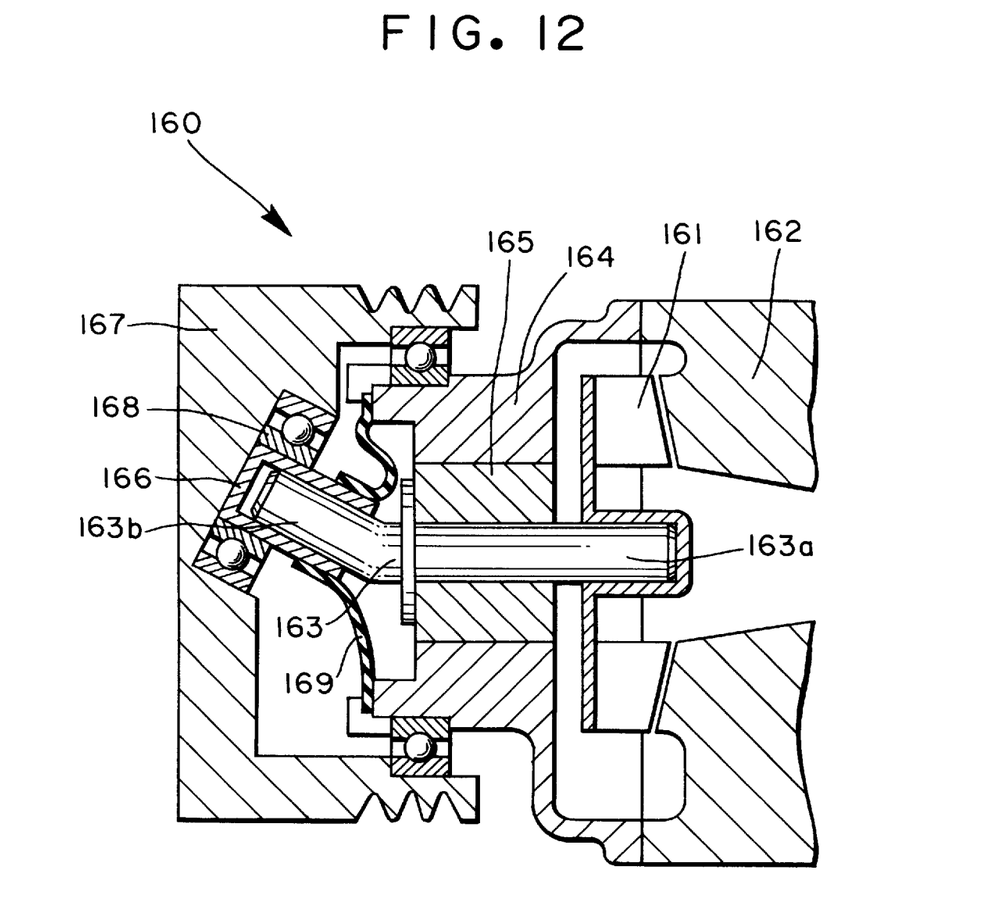
FIG. 12 is a sectional view illustrating a liquid pump according to an 11th embodiment of the present invention.

An 11th embodiment of the invention will now be described with reference to FIG. 12.

A liquid pump 160 according to this embodiment has a cylindrical housing 164 mounted on a cylinder block 162 by bolts. A pump shaft 163 has a generally V-shaped configuration constituted by a first shaft portion 163a and a second shaft portion 163b. The first shaft portion 163a, to which an impeller 161 is secured, extends along the central axis of rotation of the impeller 161 and is rotatably supported on the inner side of the housing 164 via a submerged sliding bearing 165 made of e.g. a phenolic resin. The second shaft portion 163b extends obliquely with respect to the first shaft portion 163a and penetrates into the interior of a sleeve-shaped shaft 166. A pulley 167 serving as a driving unit is rotatably supported, in coaxial relation to the impeller 161, on the left-hand outer side of the housing 164 via a roller bearing. The pulley 167 is provided with a hole inclined with respect to its axis of rotation, and the hole receives the left end of the shaft 166 via a roller bearing 168. A ring-shaped bellows 169 constituting a resilient member has an inner peripheral portion liquid-tightly fastened to the outer peripheral portion of the shaft 166. The outer peripheral portion of the bellows 169 is liquid-tightly fastened to the housing 164.

In accordance with this arrangement, rotation of the pulley 167 relative to the housing 164 causes the left end (in FIG. 12) of shaft 166 to revolve. Rotation of the shaft 166 is suppressed by the bellows 169. As the shaft 166 moves, the second shaft portion 163b rotates and applies a rotating force to the impeller 161. As a result, the impeller 161 rotates and impels the liquid. Though the liquid fills a space on the impeller side of the bellows 169, the bellows 169 performs a sealing function which prevents the liquid from leaking to the side of the pulley 167.

Figure 13:
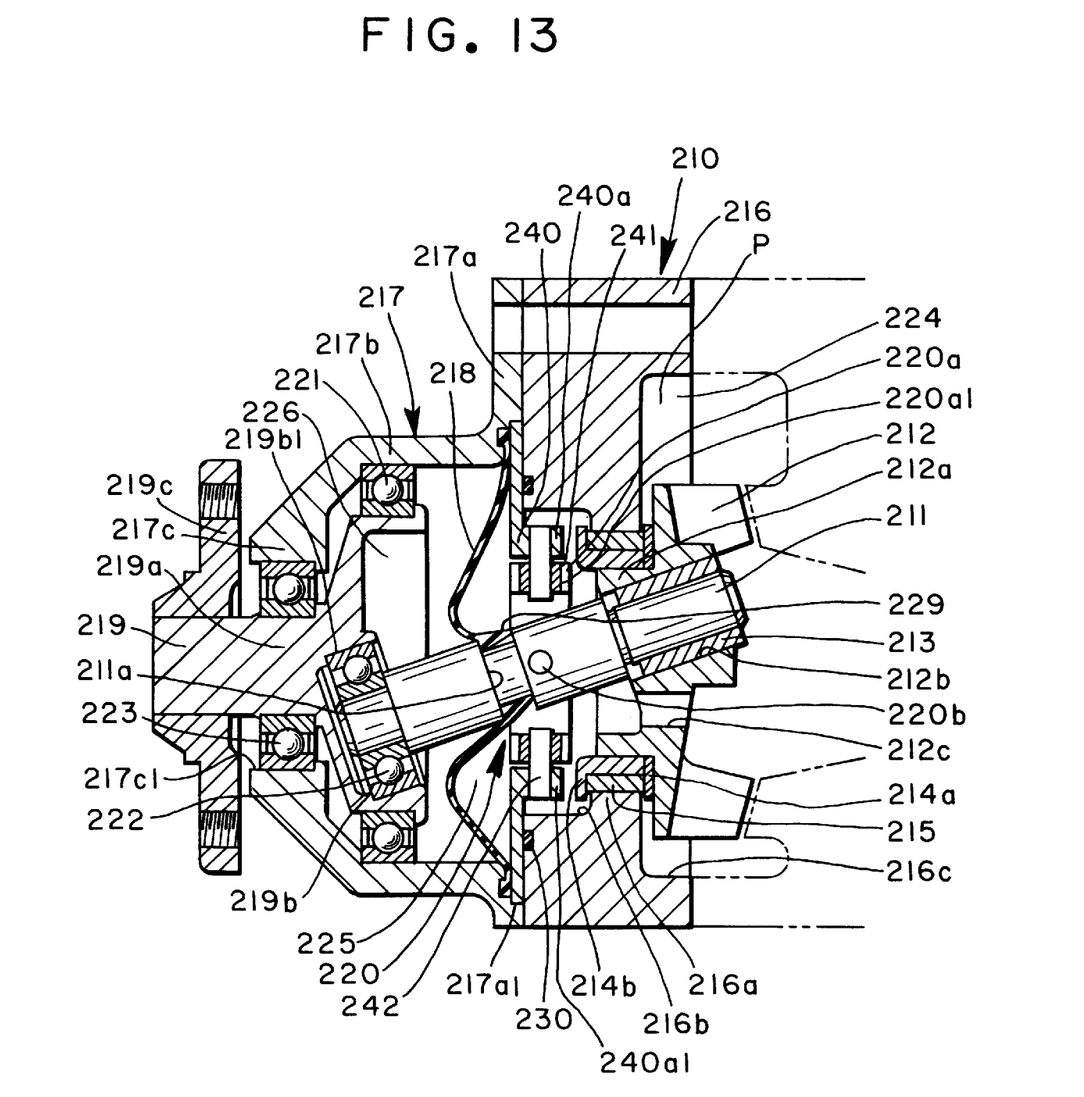
FIG. 13 is a sectional view showing a 12th embodiment of the preset invention.

FIG. 13 shows a 12th embodiment of this invention. The liquid pump 210 shown in FIG. 13 has a cylindrical first body 216 and a cylindrical second body 217 which are liquid-tightly secured to a cylinder block (not shown) by bolts (not shown). The first body 216 has a diametrically stepped bore including a diametrically reduced portion 216a in which a cylindrical submerged sliding bearing 215 formed from e.g. a phenolic resin is press fitted. On the right side of its diametrically reduced portion 216a as viewed in FIG. 13, the bore of the first body 216 has a diametrically enlarged portion 216c in which an impeller 212 is housed. The impeller 212 has a cylindrical supporting portion 212a formed on its back and supported rotatably by a sleeve 214b in the bore of the submerged sliding bearing 215. The sleeve 214b has an inner peripheral surface press fitted about the cylindrical supporting portion 212a of the impeller 212 and an outer peripheral surface fitted rotatably in the bore of the submerged sliding bearing 215. The cylindrical supporting portion 212a of the impeller 212 defines a shoulder on which a plate 214a is fitted. The outer circumferential shoulder 212a of the impeller 212 which is supported by the sliding bearing 215 lies on a circle which is concentric to the axis of rotation of the impeller 212.

The first and second bodies 216 and 217 are joined together liquid-tightly by the bolts (not shown), but securing them to the cylinder block (not shown). At its right end as viewed in the drawing, the second body 217 has a joining flange 217a having an annular groove 217a1 which is coaxial with the bore of the second body 217, and an annular plate 240 having a thickness equal to the depth of the groove 217a1 is received in the groove, and held between the bodies 216 and 217 joined together. An O-ring 230 maintains a liquid-tight seal between the first body 216 and the annular plate 240. The annular plate 240 has a cylindrical portion 240a extending from its inner edge into a diametrically medium portion 216b forming the diametrically stepped bore of the first body 216 adjacent to the second body 217. The cylindrical portion 240a has a pair of diametrically opposite holes 240a1. A universal joint 220 is mounted in the cylindrical portion 240a.

The universal joint 220 has a ring 220a having a pair of diametrically opposite holes 220a1. A cylindrical submerged sliding bearing 241 formed from e.g. a phenolic resin is press fitted in each hole 220a1 of the ring 220a. Each submerged sliding bearing 241 has a bore in which a pin 242 press fitted in each hole 240a1 of the cylindrical portion 240a of the annular plate 240 is relatively rotatably fitted. A shaft 211 is loosely fitted in the ring 220a, and a shaft portion 220b extending in the ring 220a at right angles to the pins 242 extends across the shaft 211.

The impeller 212 is housed in a pump chamber P formed between the cylinder block not shown and the diametrically enlarged bore portion 216c of the first body 216, and has a bore 212b formed apart from its center of rotation and inclined to its axis of rotation, and the shaft 211 is relatively rotatably supported at one end in the bore 212b by a submerged sliding bearing 213 formed from e.g. a phenolic resin. The submerged sliding bearing 213 is press fitted in the bore 212b of the impeller 212.

The second body 217 is shaped in the form of a bowl, and has in its portion corresponding to the bottom of the bowl an opening 217c in which the shaft portion 219a of a driving member 219 is rotatably supported by a rolling bearing 223.

A pulley seat 219c is press fitted about one end of the shaft portion 219a which is situated outside the second body 217. The shaft portion 219a has a center of rotation aligned with that of the impeller 212. A diametrically enlarged disk portion 219b is formed at the other end of the shaft portion 219a, and is rotatably supported by a rolling bearing 221 in the bore of the cylindrical portion 217b of the second body 217. The disk portion 219b of the driving member 219 has a bore 219b1 formed apart from its center of rotation and inclined to its axis of rotation, and the other end of the shaft 211 is relatively rotatably supported by a rolling bearing 222 in the bore 219b1. Coaxial with one another are the center of rotation of the impeller 212, that of the driving member 219 and that portion of the shaft 211 through which the shaft portion 220b of the universal joint 220 extends. A pulley not shown is secured to the pulley seat 219c and has a belt receiving portion, but as the driving member 219 is rotatably supported on the second body 217 by the two rolling bearings, the axial position of the center of the belt receiving portion (or the belt center) does not have to be equal to that of the rolling plane of any rolling bearing, but can be selected more freely. Despite the absence of any such axial positioning, no unbalanced load is likely to act on the rolling bearings, but they have a prolonged life.

The shaft 211 has an annular groove 211a formed in its outer surface between its portion through which the shaft portion 220b of the universal joint 220 extends, and its other end supported by the rolling bearing 222 on the driving member 219, and an annular bellows 218 defining an elastic member has an inner bead secured liquid-tightly in the groove 211a by a fastener 229. The bellows 218 has an outer bead held liquid-tightly between the annular plate 240 and the groove 217a1 of the second body 217.

According to the 12th embodiment as described above, the rotation of the driving member 219 by the pulley not shown causes the left end of the shaft 211, as viewed in the drawing, to revolve about the center of rotation of the driving member 219, and as a result, the shaft 211 makes a 'grinding' motion or 'precessional' motion about its portion supported by the universal joint 220. Accordingly, the right end of the shaft 211, as viewed in the drawing, revolves about the axis of rotation of the impeller 212 in a plane perpendicular to the axis of rotation of the driving member 219 (or of the impeller 212). As the shaft 211 is kept by the universal joint 220 from rotating on its own axis, the bellows 218 only repeats diametrical elastic deformation, and is not twisted. As a result of the revolution of the right end of the shaft 211 as viewed in the drawing, the impeller 212 receives a rotary force and rotates to direct a liquid from an intake port not shown to a discharge port. The bellows 218 defines a space 225 on its impeller side, and since the liquid is so circulated that the liquid having a high pressure may flow into the space 225 from around the impeller 212 along the sliding surface of the sliding bearing 215 and flow out between the shaft 211 and the sliding bearing 213 into the low pressure area in front of the central portion of the impeller and leading to the intake port, no excessively high pressure acts upon the bellows 218, but the inner and outer edges of the bellows 218 maintain a perfect seal between the shaft 211 and the body 217 to prevent any of the liquid from leaking toward the driving member 219. The ring 220a of the universal joint 220 repeats a swinging motion within a small angle about the pins 242 during the grinding motion of the shaft 211 as described above. The submerged sliding bearings 213, 215 and 241 are properly lubricated by the liquid circulating as described above, and are cooled with the bellows 218. The impeller 212 has a through hole 212c which communicates the space 225 with the low pressure area in front of the central portion of the impeller and leading to the intake port, and which ensures the circulation of the liquid as described above. Moreover, as the driving member 219 is supported at two points by the two rolling bearings, no unbalanced load acts upon the rolling bearings irrespective of the position of the belt center of the pulley not shown, but it is possible to transmit a rotary force smoothly and prolong the life of any submerged sliding bearing.

According to any of the various embodiments of this invention, it is possible to follow any variation in the speed of rotation properly, since the elastic member comprising a bellows, diaphragm, lip seal, or O-ring maintains a perfect seal, and since a direct shaft drive is employed.

Thus, in accordance with the present invention as described above, a strong seal is maintained between the resilient member and the shaft, and a perfect liquid-tight seal can be attained on the impeller side. Since the resilient member is not subjected to a load, its service life is prolonged.

The sliding motion between the driving unit and the shaft or the sliding motion of the universal joint is smoothed by the lubricant, as a result of which the pump is smoothly driven. This provides more stable operation.

The sealing property of the seal between the lip seal and the spherical portion is maintained in stable fashion and the lip seal does not sustain any wear.

The sealing property of the O-ring between the O-ring and the shaft is maintained in stable fashion and the O-ring does not sustain any wear.

The spherical portion on one end of the shaft slides smoothly in the spherical recess of the driving unit, and the spherical portion on the other end of the shaft slides smoothly in the spherical recess of the impeller. This provides more stable operation.

The spherical portion on one end of the shaft slides smoothly in the spherical recess of the driving unit, and the spherical portion on the other end of the shaft slides smoothly in the spherical recess of the driven pulley. This provides more stable operation.

As many apparently widely different embodiments of the present invention can be made without departing from the spirit and scope thereof, it is to be understood that the invention is not limited to the specific embodiments thereof except as defined in the appended claims.

It is claimed:

1. A liquid pump comprising:
   a housing having an inner space therein;
   a driving unit coupled to an external power means and rotatably supported on said housing;
   a shaft having a first end and a second end disposed in said inner space of said housing in oblique relation to the axial direction of said driving unit, said shaft being rotatably supported on said housing by supporting means and the first end of said shaft being rotatably supported on said driving unit;
   an impeller rotatably supported on the second end of said shaft which is disposed obliquely with respect to the axial direction of said impeller, said impeller being provided with bearing means for rotatably supporting said impeller with respect to said housing and located radially outwardly of said shaft; and a resilient member provided between said shaft and said housing for effecting a liquid-tight seal between said driving unit and said impeller, the resilient member having a peripheral portion, wherein said impeller includes side wall means having a step portion formed on the side wall of said impeller and said bearing means includes a resin member having an L-shaped cross-section, and said housing has a stepped portion which extends radially inwardly for securing the peripheral portion of said resilient member thereto and supporting said universal joint.

2. The liquid pump according to claim 1, wherein said supporting means is a universal joint which supports a central portion of said shaft and which causes said shaft to precess with respect to said housing.

3. The liquid pump according to claim 1, wherein the second end of said shaft passes through the impeller.

* * * * *